United States Patent [19]

Noble

[11] 4,204,234

[45] May 20, 1980

[54] SYSTEM FOR POSITIONING SINGLE GAP MAGNETIC HEAD TO FOLLOW MOVING RECORDED DATA TRACK

[75] Inventor: David L. Noble, Monte Sereno, Calif.

[73] Assignee: International Business Machines Corporation, Armonk, N.Y.

[21] Appl. No.: 955,729

[22] Filed: Oct. 27, 1978

[51] Int. Cl.$^2$ .............................................. G11B 21/10
[52] U.S. Cl. ......................................... 360/77; 360/109
[58] Field of Search ................................... 360/77-78, 360/70, 109, 137; 318/653

[56] References Cited

U.S. PATENT DOCUMENTS

| | | | |
|---|---|---|---|
| 3,246,307 | 4/1966 | Stanley | 360/77 X |
| 3,293,627 | 12/1966 | Auyang et al. | 360/77 X |
| 3,491,347 | 1/1970 | Farrand | 360/77 |
| 4,074,326 | 2/1978 | Smith | 360/77 X |
| 4,104,684 | 8/1978 | Wakami et al. | 360/77 X |

OTHER PUBLICATIONS

I.B.M./T.D.B. vol. 16, No. 5, Oct. 73 pp. 1379–1380, "Magnetic Head Position Sensing" by Bush et al.

Primary Examiner—John H. Wolff
Attorney, Agent, or Firm—Nathan N. Kallman

[57] ABSTRACT

Track following of a data track by a data head is accomplished by successively sampling data signals along the data track, storing the sensed signals in a data processor, computing the maximum amplitudes or crests of the successive signals, and servoing the data head towards the path defined by the maximum amplitude data signals. The data signal amplitudes and the crest values are continuously updated and employed for the servo function. A conventional read-write head having a single transducing gap of a width substantially the same as that of the data track width is used for sensing the recorded data signals.

7 Claims, 6 Drawing Figures

SYSTEM FOR POSITIONING SINGLE GAP MAGNETIC HEAD TO FOLLOW MOVING RECORDED DATA TRACK

DESCRIPTION

Technical Field

This invention relates to a servo system for a disk drive which achieves track following of a data track.

An object of this invention is to provide a track following servo system that requires no separate servo signals or servo head.

Another object of this invention is to provide a servo system that requires only a single transducing element for sensing head position relative to a data track.

Another object is to provide a servo system wherein continuous servo correction is achieved in response to sampled data in a simple and inexpensive manner.

BACKGROUND ART

In disk drives that employ accessing magnetic heads, it is generally necessary to provide means to maintain the head substantially over the center of a selected data track to obtain an optimum readout signal. For this purpose, track following servo systems have been used to compensate for position error and to drive the head towards the center of the track whenever displacement occurs. In prior art servo systems, separate servo signals are registered either on a separate disk surface or in servo sectors on the disk surface utilized for recorded data. Such arrangements require separate servo heads, or suffer from reduced storage capacity necessitated by dedicating disk surface area for servo signals.

In U.S. Pat. No. 3,246,307, a servo positioning system is disclosed that employs a magnetic head with two separate spaced magnetic elements for sensing data tracks as the source of servo information. However, when operating with disk drives that employ relatively high track densities and narrow track widths, the spacing, alignment and attitude of the separate magnetic elements are critical for deriving accurate readouts of recorded signals. Such requirements impose tight tolerances and stringent manufacturing processes which make production and maintenance costly, uneconomical and not feasible.

SUMMARY OF THE INVENTION

According to this invention, a servosystem such as used with an accessing head disk file that affords track following employs a conventional read/write data head to sense amplitudes of recorded data along the data track. Peak amplitudes are determined by a computing apparatus, and the values stored in digital form. When the data head moves away from the center of the track, at which position the maximum amplitudes are sensed, the servo drive moves the data head back towards the center of the data track. The peak amplitudes or crest values are continuously updated.

BRIEF DESCRIPTION OF THE DRAWINGS

The invention will be described in greater detail with reference to the drawing in which.

DISCLOSURE OF THE INVENTION

Figure 1:
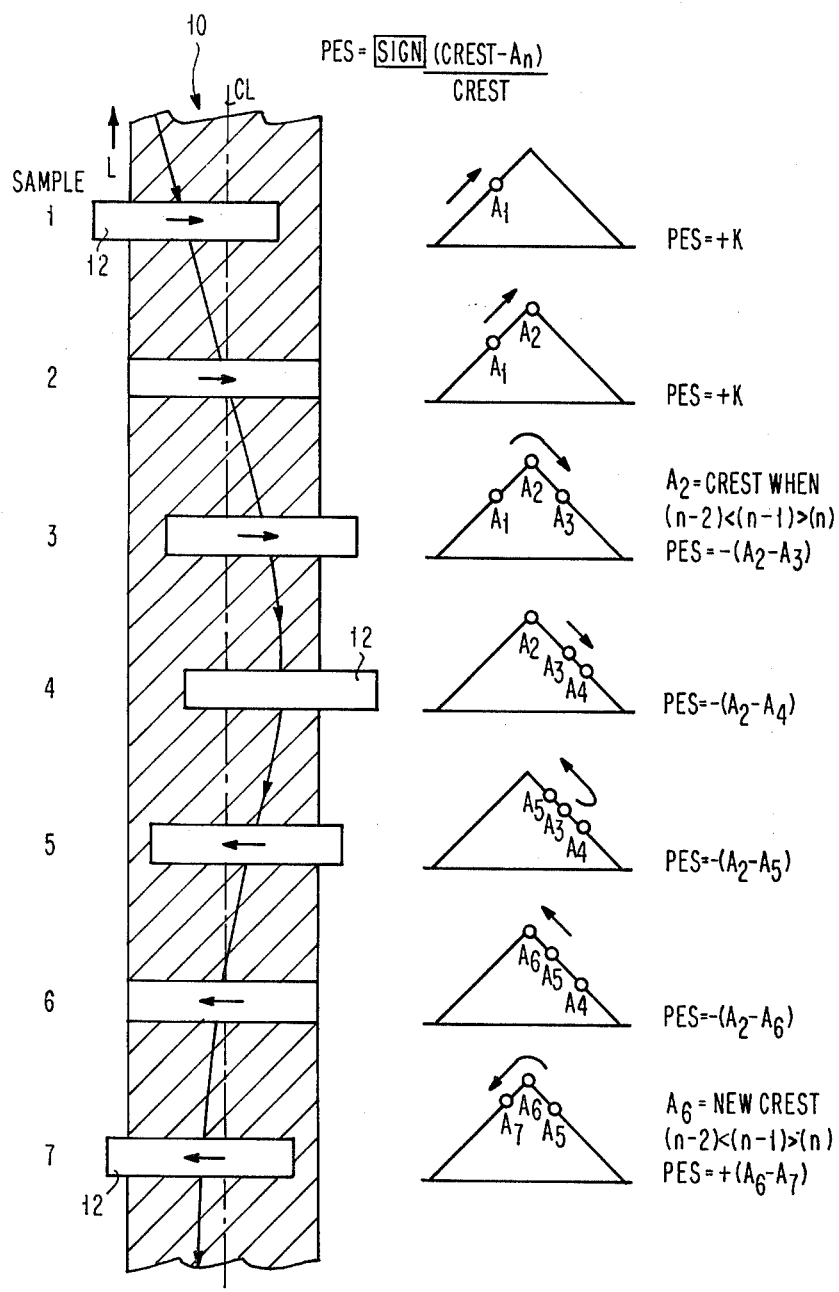
FIG. 1 is a pictorial representation of the track following process contemplated by this invention.
Figure 2:
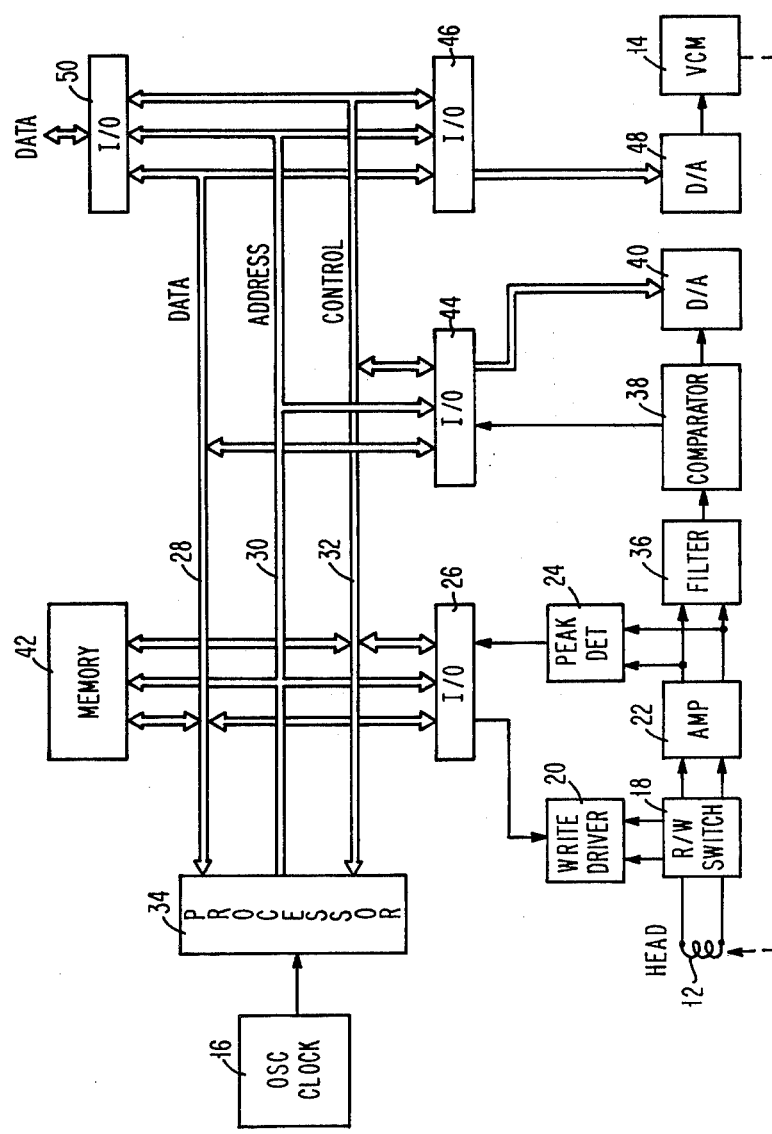
FIG. 2 is a block diagram of the control portion of a disk file system for storing and retrieving information.

In FIG. 1, a data track 10 which may be recorded on a disk or tape, for example, is moved along a path in the direction of the arrow L relative to an accessing head 12. The data track 10 may be one of a multiplicity of data tracks recorded on a medium. A selected data track is accessed by the head 12, which may be controllably moved by means of a linear motor, such as a voice coil motor 12 (FIG. 2). As illustrated, the transducing gap of the head 12 is substantially of the same width as that of the data track 10. It is apparent that the maximum amplitude readout signal will be obtained when the head gap is aligned and centered with the centerline CL of the data track.

Detection of the crest or maximum amplitude signal is accomplished by the analysis of successive digitized amplitude track signal samples, designated as $(n-2)$, $(n-1)$ and $(n)$. $(n)$ designates the most recent sample. A crest condition or the sensing of a maximum amplitude is derived when $(n-2)$ is less than $(n-1)$ which in turn is greater than $(n)$. Such condition indicates that the track center was crossed substantially at the head-to-track position where sample $(n-1)$ was sensed.

The new position error signal (PES) value for sample $(n)$ is computed as $[(n-1)-(n)]$ divided by $(n-1)$. Division by the "current crest" sample $(n-1)$ normalizes the PES value for signal variations between different tracks, different heads and the like. The polarity or sign of the new PES value, each time a new crest is detected, is determined by multiplying the previous value by $-1$. The PES value for sample $(n+1)$ is computed as $[(n-1)-(n+1)]$ divided by $(n-1)$ and so on, until a following crest condition occurs. A new crest value is then stored, and the servo direction control signal is again reversed in polarity. By continuing this procedure the servo feedback system is able to direct the head to servo back and forth towards the track centerline, as depicted in FIG. 1.

In operation, as the data track 10 is moved at a predetermined speed past the head 12, undesirable displacements from the track centerline occur due to mechanical manufacturing tolerances, eccentricity, runout, and thermal variations, among other things. The track following servo system of this invention enables the head to move towards the track centerline thereby enhancing readout of the recorded signal.

As the data track is moved, data signals are sampled at uniformly spaced time intervals under control of an oscillator clock 16 (FIG. 2). In the illustration of FIG. 1, seven samples are taken successively, the readout signals having theoretical amplitudes A1, A2 ... A7 respectively.

At sample position 1, which we may designate as an initialization phase, in the example of FIG. 1, the amplitude of the sensed signal is A1, while the position error signal PES is arbitrarily assigned a digital value of $+K$. The PES is characterized with a sign, positive or negative, which is an indication as to which side of the centerline of the data track 12 the magnetic head is displaced.

As the recorded track 12 continues to move, the head 10 senses a second recorded signal at sample position 2 under control of the clock 16. At sample position 2, the gap of the magnetic head 10 is in alignment with the data track 12, which produces a maximum output amplitude A2, at which point a crest condition is illustrated. However, with only two samples at this point in time, we cannot as yet compute or determine the actual presence of a crest.

At sample position 3, the magnetic head 10 has crossed the centerline CL, which enables the computation of the crest or maximum amplitude of the signal amplitudes A1, A2 and A3. It is thus seen that A2 is a crest signal, since signal A1 sampled at time (n−2) relative to the present position (n) is less than signal A2 at time (n−1), and A2 is greater than A3, the amplitude at the present position (n).

The digital value of the position error signal PES at sample position 3 is proportional to −(A2−A3), which in effect is the distance from the track centerline CL. The PES digital value for any given signal sample is proportional to the crest value less the amplitude of the immediate sample.

While the record track is moving so that the head 10 relatively advances to sample position 4, the detected PES is used in the servo system to direct the head from its displaced position towards the center of the data track. Thus at position 4, a reversal of the direction of displacement begins so that at sample position 5 the head is moved closer to track center.

At sample position 6, the head is again centered over the track and a crest or maximum amplitude signal A6 occurs. At sample position 7, after the head has crossed the track center and is again displaced, an amplitude signal A7 of lower magnitude than signal A6 is registered, thereby confirming signal A6 as the most recent crest signal. Also, as the crest is passed, a change in polarity of the PES digital signal is effectuated to indicate on which side of track center the head is located.

FIG. 2 is a block diagram of the control portion of a disk file system for storing and retrieving information. Control of reading, writing, track seeking, and track following is accomplished by means of a conventional digital computing system. The computing system has I/O interface ports through which it can communicate to peripheral equipment:

a. Input and output data to the system via I/O port 50.
b. Write data to the magnetic head 12 through I/O port 26 via write driver 20 and R/W switch 18.
c. Read back data from the magnetic head 12 through I/O port 26 via R/W switch 18, amplifier 22 and peak detector 24.
d. Head-to-track registration information through I/O port 44 via filter 36, and comparator 38.
e. Servo information to the magnetic head accessing mechanism through I/O port 46 via digital-to-analog converter 48 and voice coil motor 14.

Data for recording, playback, head accessing, and track following is transmitted between the computing system components via bidirectional data bus 28. The data bus enables data to flow between processor 34, memory 42, and I/O interfaces 26, 44, 46, and 50. The address bus 30, controlled by the processor, consists of a unidirectional group of lines which identify a particular location in memory or I/O port. The control bus 32 is a bidirectional bus that passes signals from I/O ports for gaining the attention of the processor, when outside information is ready to be accepted by the computing system, or for activation by the processor of a specified I/O port or memory function for transmitting information out from the processor.

By a stored program in the computing system memory, 42, the processor 34 acquires data from the various I/O ports, formats the data for recording and playback, stores servo information for subsequent use in memory 42, computes values for servo control and directs the head accessing equipment to seek a specified disk track and to follow the dynamic runout of the tracks.

In the block diagram of FIG. 2, an I/O port 26 is connected to the input of the write driver 20 and the output of the peak detector 24. The I/O port 26 is coupled through conventional busses 28, 30 and 32 to accept, transmit and interchange digital data, control signals and addresses with the data processor 34. A conventional read/write head 12 having a single transducing element is coupled to a read/write switch 18, which couples a write driver 20 to the head during the write mode. During the read mode, the switch 18 gates the analog readout signal through an amplifier 22 and to a peak detector 24 which converts each peak of the recovered track signal into a discrete pulse or bit whose position in time with relation to the other bits may be decoded by the processor into the appropriate alphanumeric characters of the stored data. These peripheral circuits, 20, 18, 22, and 24, permit the processor through I/O port 26 to record and recover stored data via recording/reproducing head 12 from the tracks of the disk file in a conventional manner.

In accordance with this invention, the track analog readout signal from amplifier 22 is also passed through a filter 36 to rectify and smooth or average the signals from the track being followed. The filtered signal is applied to a comparator 38 which also receives as its second input an analog signal from the processor controlled digital-to-analog converter 40.

The processor, through the stored program, transmits digital values to the digital-to-analog converter 40 in a predetermined sequence, awaiting between each transmission a feedback signal from the comparator 38. The comparator 38 recognizes the relative amplitudes of its two inputs and transmits a pulse back to the processor through I/O port 44, when the processor controlled digital-to-analog signal equals or exceeds the smoothed track analog signal. In this way samples of the track analog signal amplitude are recognized by the processor as the equivalent digital value it has transmitted to digital-to-analog converter 40. This method of analog-to-digital conversion in the art of process control is known as "successive approximation." These digital samples are stored by the processor 34 in the computer memory 42 where they may be retrieved for ongoing computations, such as;

a. The search for new crest values by comparing in the processor the relative amplitude of successive samples;
b. The change in direction of displacement toward the center of the track when each new crest is discovered.
c. The modification and storage of a crest amplitude and the storage of the associated change in displacement direction at each successive crossing of the track center;
d. The magnitude of the servo correction signal or PES as the numerical difference between the digital crest value and each off-track signal sample, divided by the crest value;

e. The introduction of any necessary corrective phase or gain compensation for the servo system stability;

f. Other computations which may be used to "monitor" the ongoing servo action to guard against the detection of false crests or to take corrective action should a crest be missed.

The corrective servo signals are transmitted from the processor 34 through the data bus 28 and I/O port 46 to a digital-to-analog converter 48, which applies the correction value to the voice coil motor 14. The motor in turn, moves the recording head with respect to the recorded track.

The track following servo loop of this invention operates by the application of a track amplitude signal sample from the playback head 12, through R/W switch 18, amplifier 22, filter 36 to comparator 38 where it is recognized through I/O port 44 by the processor 34 as corresponding to a digital value applied by the processor to digital-to-analog converter 40 through I/O port 44. The equivalent digital value is stored by the processor in the computing system memory 42 and the processor proceeds to use this value in conjunction with previous stored samples to compute a head position error signal (PES). The computed PES value is then transmitted through I/O port 46 to digital-to-analog converter 48 and to the voice coil motor 14 which moves head 12 toward the track center.

Figure 3A:
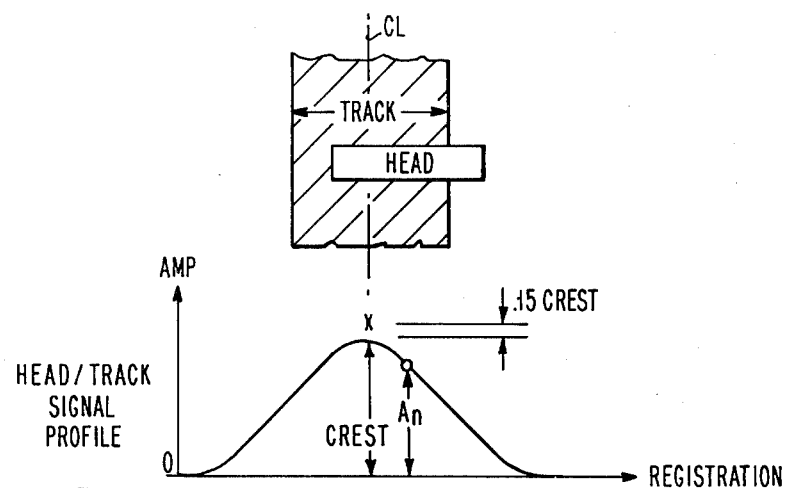
FIGS. 3A and 3B illustrate plots of the amplitudes of sampled signals and position error signals with reference to registration of successive data signals along the data track.
Figure 3B:
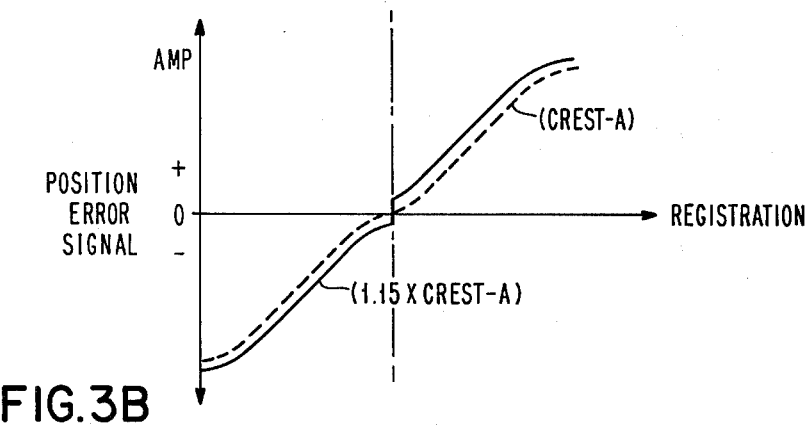

In FIG. 1 the signal amplitude variations across a track, for illustrative purposes, were depicted in the form of triangles. In practice this is not the case as the amplitude signals do not increase linearly to a peak as the head approaches the center of the track, but are rounded as shown in FIG. 3A. When PES values are computed, this rounding effect introduces a dead zone near track center. To compensate for this, the computing system may modify the crest value by the application of an empirical crest correction factor. In operation, the processor 34 adds about 15% to the digital value of the crest before the PES value is computed. This eliminates the dead zone, as illustrated in FIG. 3B, which shows the variation in position error signal between the actual measured crest (dashed line) and the modified crest signal (in solid line). The modification of the crest by a factor of 15% also introduces a small positive corrective action on either side of the crest to assure the track following head will be forced across track center and prevent it from trying to ride on the crest of the recovered track signal.

Figure 4:
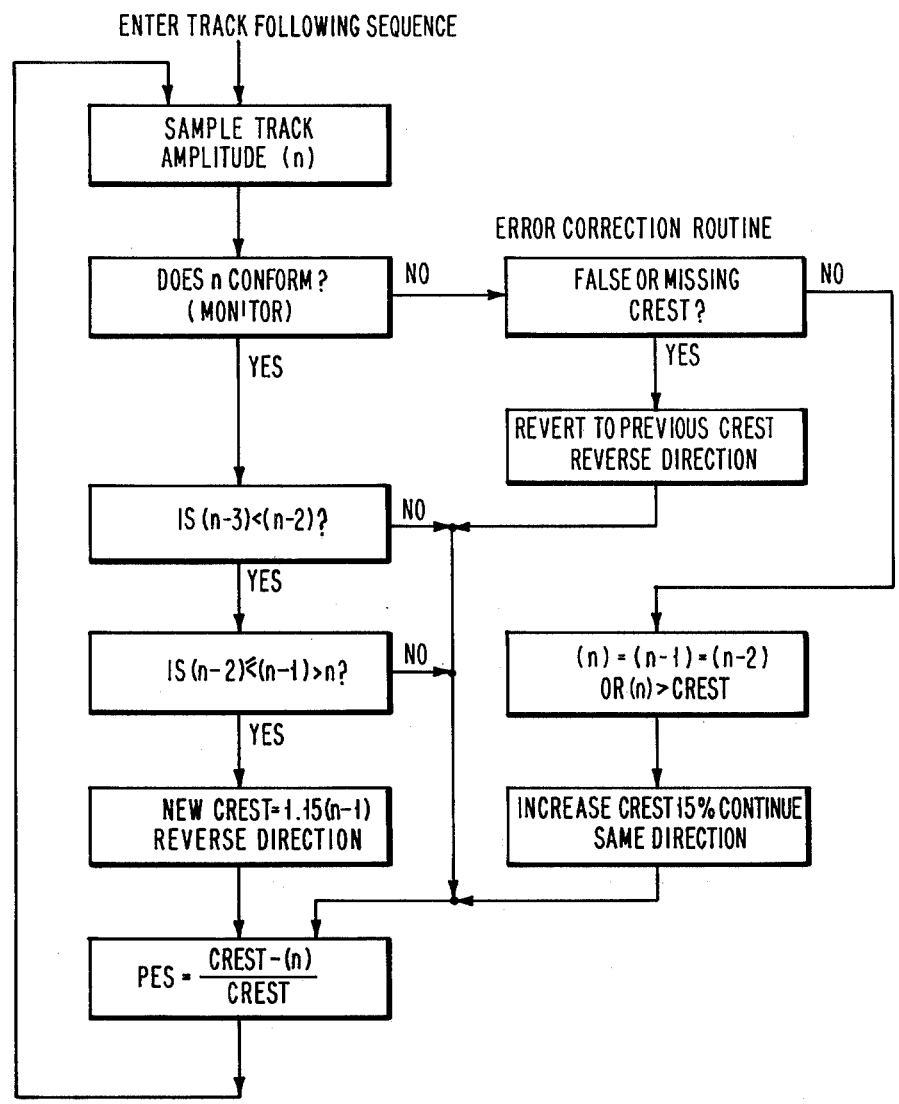
FIG. 4 is a logic flow diagram for a track following sequence.
Figure 5:
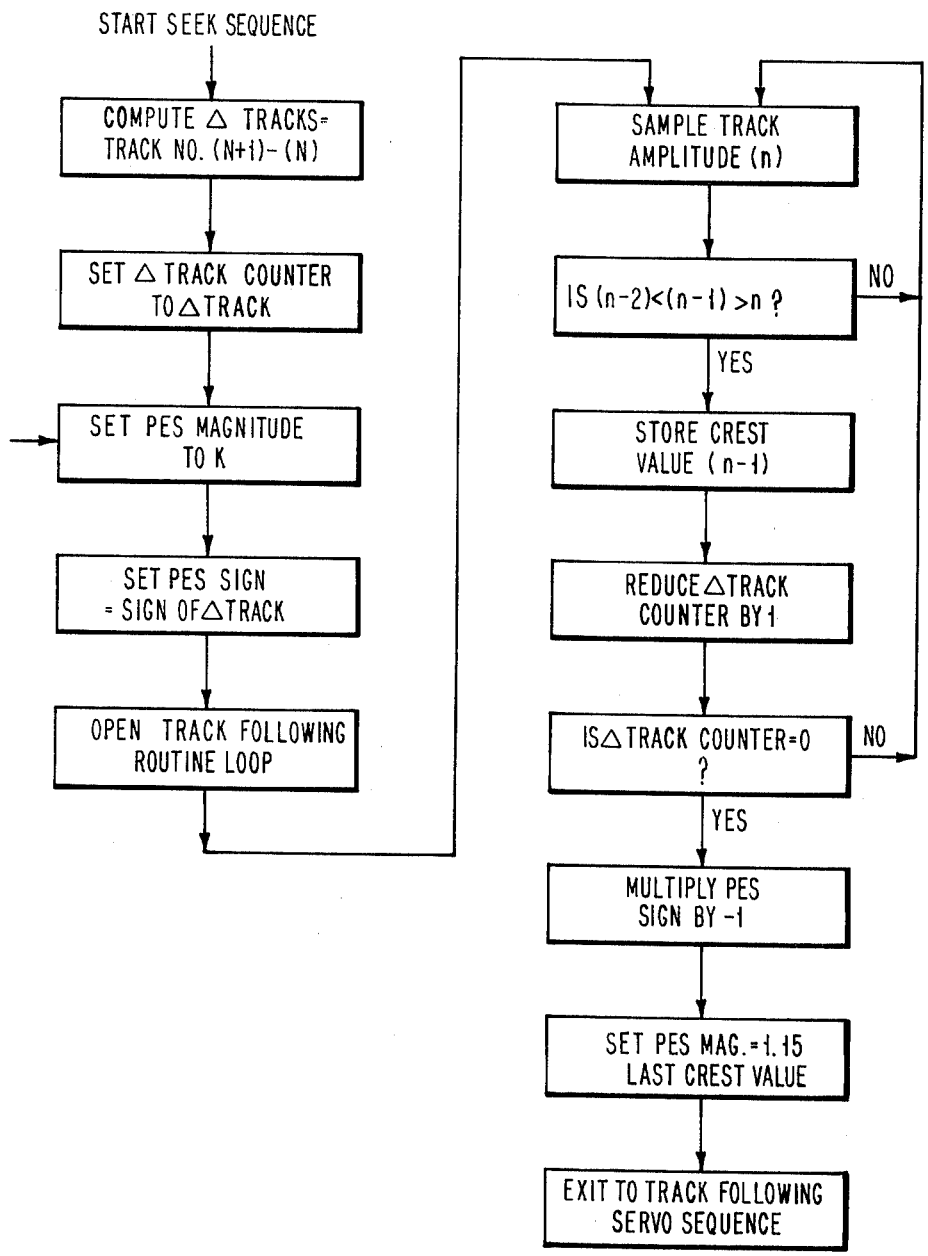
FIG. 5 is a logic flow diagram for an access or SEEK sequence.

FIG. 4 shows a logic sequence that could be used for determining PES values during the track following mode, whereas FIG. 5 shows the logic sequence used during a seek sequence.

In FIG. 4 one routine operates for the track following sequence to determine the PES value and whether or not a new crest has been sensed. In this routine, a fourth sample (n−3) is compared with the third sample (n−2) in sensing for a new crest. Four samples instead of three samples strengthens the criteria for crest detection. Signal samples must conform with the physical motion of the track following head as it crosses from first one side and then the other of the track center. The amplitude of the fourth sample must therefore be less than the third sample, as the head passes the center of a track and a new crest is detected. The redundancy of a fourth sample is a hedge against noise which could be detected by the processor as a false crest. A second routine provides an error correction function that is effectuated should a false or missing crest be sensed.

The sequence of FIG. 5 provides a routine for the seek mode of file operation. The difference between the number of the track to be accessed to, a new track address, and the number of the track presently being followed, the present track address, is determined by a stored "seek program" within the computing system. This difference value, the number of tracks to be traversed, and its sign is recorded within the computing system memory where it can automatically be withdrawn and reduced by one each time the accessing head traverses the center of an intervening track. The stored "seek program" applies a seek PES value to the voice coil motor to move the recording-playback head in the appropriate direction toward the new track. As in the track following mode of operation, track signal amplitudes are periodically sensed, converted to digital values by the stored program, and the crest searching process is performed by the comparison of the relative amplitudes of groups of successive track signal amplitudes. As intervening track centers are crossed by the accessing head, crest values are detected, and the track difference value in the computing system memory is reduced by one. When the track difference value has been reduced to zero the desired new track addressed has been reached by the accessing head. At the conclusion of the seek sequence, the apparatus moves into the track following operation of FIG. 4.

There has been disclosed herein a novel track following servo system which employs a conventional data head and a servo loop, including a data processor and memory with a stored program for determining data signal crest values. The crest values and successive track samples in digital form are utilized to calculate the displacement of the data head from track center. A position error signal is generated and used to move the head towards the center of the data track.

I claim:

1. A method for positioning a magnetic head to center on a recorded data track comprising the steps of:

serially sampling at uniformly spaced intervals under control of a clock with said head at least three recorded data signals relating to sequential positions along the length of said data track, said head having a single transducing gap of a width substantially the same as the width of said data track;

converting said sampled signals to digital values;

storing said sampled signals in the memory of a computing unit;

computing the maximum amplitude signal of each of said sampled signals;

computing a position error signal from said maximum amplitude signal and each of said sampled signals; and moving said head towards the center of said data track in response to the position error signal.

2. A method for positioning a magnetic head as in claim 1, including the step of determining the position error signal from the difference between the digital signal representing the most recent sampled maximum amplitude signal and the digital signal representing the most recent sampled signal.

3. A method for positioning a magnetic head as in claim 1, including the step of adding a percentage of the digital signal representing the maximum amplitude signal to said digital signal, so that dead zones are effectively eliminated.

4. Apparatus for positioning a magnetic head to center on a recorded data track comprising:

means for serially sampling at uniformly spaced intervals under control of a clock with said head at least three recorded data signals relating to sequential positions along the length of said data track, said head having a single transducing gap of a width substantially the same as the width of said data track;

means for converting said amplitude signals to digital signals;

means for storing said sampled signals;

data processing means for computing the maximum amplitude of each of said signals; and means for moving said head relative to said data track to a position related to said maximum amplitude signals while the data track is moving relative to said head.

5. Apparatus as in claim 4, including a comparator for comparing the processed analog signal derived from said data head and an analog signal representing the digital value applied by said data processing means to said comparator.

6. Apparatus as in claim 4, including an oscillator coupled to said processing means for delineating the sampling times for said sampling means.

7. Apparatus as in claim 4, wherein said data processing means comprises a memory with a stored program.

* * * * *